(12) United States Patent
Filatoff

(10) Patent No.: US 9,712,980 B1
(45) Date of Patent: Jul. 18, 2017

(54) FACILITY MAPPING AND INTERACTIVE TRACKING

(71) Applicant: Alexey Filatoff, Los Angeles, CA (US)

(72) Inventor: Alexey Filatoff, Los Angeles, CA (US)

( * ) Notice: Subject to any disclaimer, the term of this patent is extended or adjusted under 35 U.S.C. 154(b) by 0 days.

(21) Appl. No.: 14/621,217

(22) Filed: Feb. 12, 2015

Related U.S. Application Data

(60) Provisional application No. 61/942,988, filed on Feb. 21, 2014.

(51) Int. Cl.
| | | |
|---|---|---|
| *H04W 4/04* | (2009.01) | |
| *H04W 4/02* | (2009.01) | |
| *G01S 5/02* | (2010.01) | |
| *G01S 3/04* | (2006.01) | |

(52) U.S. Cl.
CPC ............ *H04W 4/043* (2013.01); *G01S 3/046* (2013.01); *G01S 5/0294* (2013.01); *H04W 4/02* (2013.01)

(58) Field of Classification Search
CPC .................................................. H04W 4/043
See application file for complete search history.

(56) References Cited

U.S. PATENT DOCUMENTS

| | | | | |
|---|---|---|---|---|
| 2003/0011467 A1* | 1/2003 | Suomela | ................ | H04W 4/02 340/7.1 |
| 2008/0127246 A1* | 5/2008 | Sylvain | ............ | H04N 21/25435 725/32 |
| 2011/0237274 A1* | 9/2011 | Wong | ...................... | H04W 4/04 455/456.1 |
| 2011/0269479 A1* | 11/2011 | Ledlie | ................... | H04W 64/00 455/456.1 |
| 2011/0320256 A1* | 12/2011 | Florucci | .................. | H04W 4/04 705/14.33 |
| 2012/0004961 A1* | 1/2012 | Flynn | ..................... | G06Q 30/02 705/14.5 |
| 2013/0085866 A1* | 4/2013 | Levitis | ............... | G06Q 30/0207 705/14.69 |
| 2013/0103200 A1* | 4/2013 | Tucker | ................. | G01C 21/206 700/275 |
| 2013/0166622 A1* | 6/2013 | Arunachalam | ......... | H04W 4/02 709/202 |
| 2013/0185115 A1* | 7/2013 | Regan | ................ | G06Q 30/0238 705/7.29 |
| 2014/0128023 A1* | 5/2014 | Guerra | ................... | H04W 4/24 455/406 |

* cited by examiner

*Primary Examiner* — Lester Kincaid
*Assistant Examiner* — Daniel G Bassett
(74) *Attorney, Agent, or Firm* — Plager Schack LLP

(57) ABSTRACT

A portable electronic device configured to function as an electronic identifier in a facility and to display an interactive graphical facility map of the facility, a facility mapping and visitor tracking system, and a set of facility mapping and visitor tracking processes are disclosed.

7 Claims, 7 Drawing Sheets

FACILITY MAPPING AND INTERACTIVE TRACKING

CLAIM OF BENEFIT TO PRIOR APPLICATION

This application claims benefit to U.S. Provisional Patent Application 61/942,988, entitled "PORTABLE ELECTRONIC DEVICE," filed Feb. 21, 2014. The U.S. Provisional Patent Application 61/942,988 is incorporated herein by reference.

BACKGROUND

Embodiments of the invention described in this specification relate generally to mapping processes, systems, and portable electronic devices, and more particularly, to specific facility mapping and interaction processes, systems, and portable electronic devices.

People who intend to receive or utilize a service or obtain an item are sometimes presented with a paper ticket that typically includes a magnetic tape or stripe that contains a small and limited amount of information which allows a person holding the ticket to receive or utilize the service or obtain the item in advance of, or contemporaneously with, paying for the service or the item. For example, when entering a parking facility, a person may receive a paper ticket with an entry time encoded on the magnetic stripe, and, when exiting the parking facility, may need to use the paper ticket to pay for an amount of time the person parked a vehicle in the parking facility. Such paper tickets and information-encoded magnetic stripes are limited in usefulness due to the data storage constraints of the magnetic tape. This is problematic for many people who would benefit by having more information about a particular facility. This is also problematic for vendors, merchants, and others who would benefit by being able to present custom information about services and/or items which the vendors, merchants, or others offer at any given location or facility.

Therefore, what is needed is a way to provide enhanced information to a person at a location or facility where the enhanced information includes information about the location or facility as well as information related to services or items offered by vendors, merchants, or others at the location or facility.

BRIEF DESCRIPTION

A portable electronic device configured to function as an electronic identifier in a facility and to display an interactive graphical facility map of the facility, a facility mapping and visitor tracking system, and a set of facility mapping and visitor tracking processes are disclosed.

In some embodiments, the portable electronic device is configured to function as an electronic identifier in a facility and to display an interactive graphical facility map of the facility. In some embodiments, the electronic identifier comprises an electronic parking ticket.

In some embodiments, the facility mapping and visitor tracking system includes a set of wireless communication devices and a set of portable electronic devices configured to function as electronic identifiers in the facility for a set of visitors of the facility.

In some embodiments, the set of facility mapping and visitor tracking processes includes a user process for obtaining a portable electronic device and then displaying and interacting with an interactive graphical facility map on a display screen of the portable electronic device used by a facility visitor. In some embodiments, the set of facility mapping and visitor tracking processes includes a server process for registering a portable electronic device dispensed to a facility visitor and then generating an interactive graphical facility map and communicating with the portable electronic device used by the visitor at the facility.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
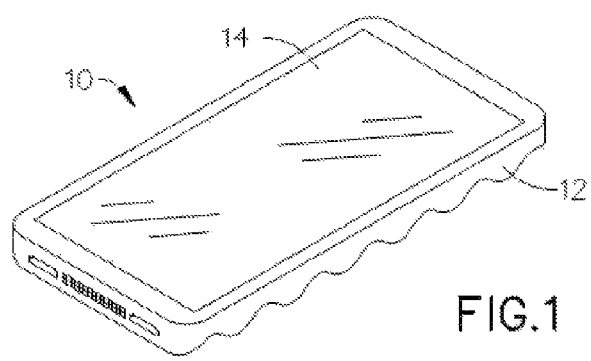
FIG. 1 conceptually illustrates a perspective view of a portable electronic device configured to display an interactive graphical facility map in some embodiments.

In the following detailed description of the invention, numerous details, examples, and embodiments of a facility mapping and tracking system, a facility mapping and tracking process, and a portable electronic device configured to function as an electronic identifier in the facility and to display an interactive graphical facility map of the facility are described. However, it will be clear and apparent to one skilled in the art that the facility mapping and tracking invention is not limited to the embodiments set forth and that the invention can be adapted for any of several applications.

As stated above, many existing facility system use paper tickets with magnetic stripes in order to provide a service or item and/or track information about facility users. For instance, a parking garage may provide paper tickets with magnetic stripes that record entry time and track total parking time of a user by calculating the difference when the user exits the parking garage. However, such paper tickets include only a small and limited amount of information. The data storage constraints of the magnetic tape on a paper ticket limits the usefulness of the paper ticket. Embodiments of the invention described in this specification solve such problems by collecting and analyzing experiences of facility visitors and by delivering facility-based vendor and business advertising content to the facility visitors.

I. Portable Facility Mapping and User Tracking Device

In some embodiments, the portable electronic device is configured to function as an electronic identifier in a facility and to display an interactive graphical facility map of the facility. In some embodiments, the electronic identifier comprises an electronic parking ticket.

By way of example, FIGS. 1-4 conceptually illustrate portable electronic devices that are configured to display interactive graphical facility maps. In particular, FIG. 1 conceptually illustrates a perspective view of a portable electronic device 10 configured to display an interactive graphical facility map in some embodiments. As shown in this figure, the portable electronic device 10 includes a uniquely shaped device housing 12 and a display screen 14. While the device housing 12 in this example provides a single shape, a person skilled in the relevant art would understand that many other housing shapes would be possible to house the portable electronic device 10 configured to display an interactive graphical facility map. Similarly, the display screen 14 can be any shape according to the shape of the housing 12 used to house the portable electronic device 10. The display screen 14 of some embodiments is a touch-sensitive display screen which allows a user of the device 10 to interact with the device 10 by finger movements and touch. Examples of finger movements and touch that a user may conduct to interact with the device include swiping a finger across the display screen 14 or touching a surface location on the display screen 14. A person skilled in the relevant art would understand there to be several other types of gesture-based finger movements, touches, and orientations, which allow the user to interact with the device 10.

In some embodiments, the portable electronic device 10 includes a microphone (not shown in FIG. 1) that allows a user of the device 10 to make audible requests and commands which are received by the microphone and translated into machine-readable instructions for the device 10 to handle. For example, a user of a device 10 may request a location of a food vendor while searching for a parking location, and upon receiving the request for the location of the food vendor, the device 10 may direct the user to a parking spot that is nearby the requested food vendor. In some embodiments, the portable electronic device 10 includes one or more speakers (not shown in FIG. 1) through which audible directions and instructions are provided for a user of the device 10 to hear when navigating the facility.

Figure 2:
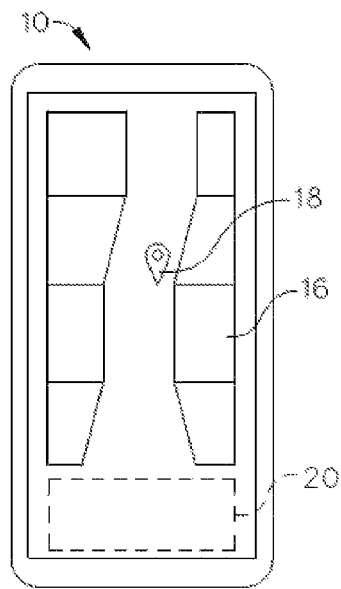
FIG. 2 conceptually illustrates an example of a facility map in a graphical user interface (GUI) displayed on a display screen of a portable electronic device configured to display an interactive graphical facility map in some embodiments.
Figure 3:
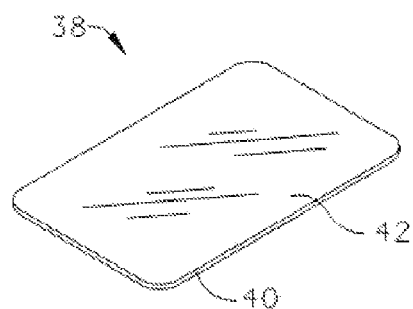
FIG. 3 conceptually illustrates a perspective view of an alternative second portable electronic device configured to display an interactive graphical facility map in some embodiments.

Now turning to FIG. 2, an example of a facility map 16 is conceptually illustrated in a graphical user interface (GUI) displayed on the display screen 14 of the portable electronic device 10 described by reference to FIG. 1. As shown in this figure, the facility map 16 includes a location indicator graphical element 18 and an information display area 20 of the GUI.

In some embodiments, the location indicator graphical element 18 displays a real-time location of a user of the device 10 as the user moves within the facility. In some embodiments, a view of the facility map 16 is updated as the user moves within the facility so that the location indicator graphical element 18 is centered within the view of the facility map 16 being displayed on the display screen 14 of the device 10. In some embodiments, the location indicator graphical element 18 moves within the facility map 16 displayed on the display screen 14 of the device 10. For example, the movement of the location indicator graphical element 18 may mimic the tracked movements of the user of the device 10 within the facility, causing the facility map 16 displayed on the display screen 14 of the device 10 to remain static until or unless the user moves to a location of the facility that maps to a non-displayed position of the facility map 16. In such a scenario, the portable electronic device 10 of some embodiments updates a map display view of the facility map 16 to reposition the location indicator graphical element 18 at the center of the updated map view.

In some embodiments, the information display area 20 is configured to show textual directions to a destination location, such as a parking spot or a particular vendor. For example, a user of the device 10 map request a location of the particular vendor by an audible request (e.g., speaking the name of a vendor in a microphone of the portable electronic device 10) or a textual request (e.g., using a digital or physical keypad to type in a vendor name). In some embodiments, the information display area 20 is configured to display advertisements associated with vendors at the facility. Advertisements can include textual information about products, services, or vendors in general. Advertisements can further include imagery, such as photo images, computer graphics imagery (CGI), and/or video advertisements.

Figure 4:
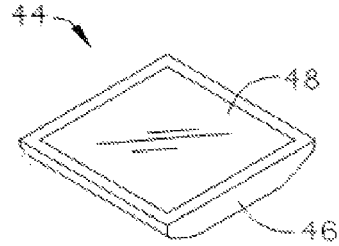
FIG. 4 conceptually illustrates a perspective view of an alternative third portable electronic device configured to display an interactive graphical facility map in some embodiments.

The examples described by reference to FIGS. 1-2 conceptually illustrate one type of portable electronic device 10. However, a person skilled in the relevant art would understand that many other types of portable electronic devices could be configured to display an interactive graphical facility map. By way of example, FIG. 3 conceptually illustrates a perspective view of an alternative second portable electronic device 38 configured to display an interactive graphical facility map in some embodiments. As shown in this figure, the alternate second portable electronic device 38 includes an alternate second device housing 40 and an alternate second device display screen 42. Another example embodiment is shown in FIG. 4, which conceptually illustrates a perspective view of an alternative third portable electronic device 44 configured to display an interactive graphical facility map. The alternate third portable electronic device 44 in this figure includes an alternate third device housing 46 and an alternate third device display screen 48.

While the descriptions of the portable electronic devices illustrated in FIGS. 1-4, present general examples of facility mapping, user tracking, and advertising, some specific systems which utilize portable electronic devices are described in the next section.

II. Facility Mapping and Visitor Tracking System

In some embodiments, the facility mapping and tracking system includes a set of wireless communication devices and a set of portable electronic devices configured to function as electronic identifiers in the facility for a set of users at the facility. In some embodiments, the facility mapping and tracking system utilize real-time location information of the portable electronic devices to provide mappable data to the portable electronic devices in relation to the real-time location information for the display of interactive graphical facility maps.

Figure 5:
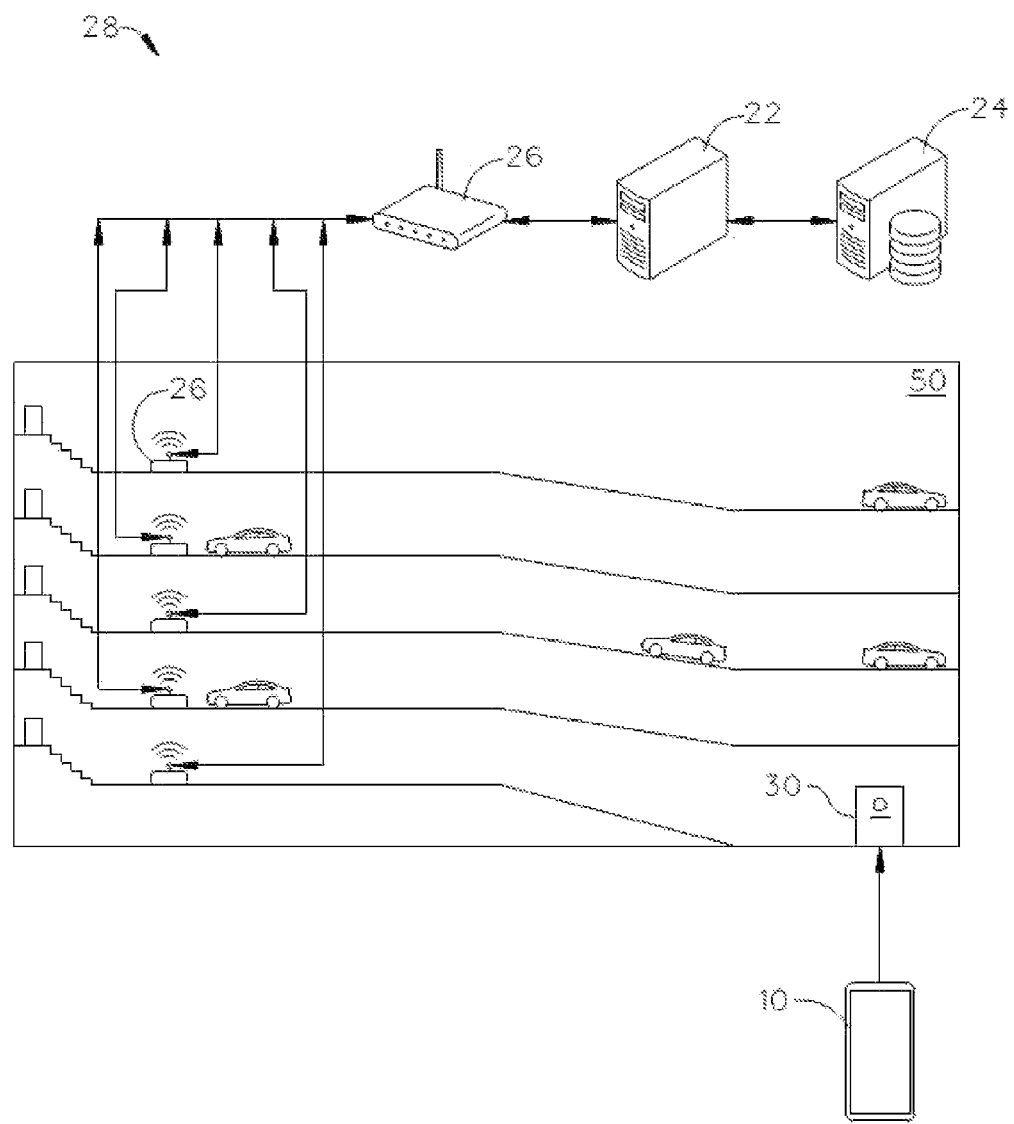
FIG. 5 conceptually illustrates a schematic view of a graphical facility map generating system used in a parking facility in some embodiments.

By way of example, FIG. 5 conceptually illustrates a schematic view of a facility mapping and tracking system 28 implemented for use in a parking facility 50. As shown in this figure, the facility mapping and tracking system 28 includes a server computing device 22, a database server computing device 24, a set of wireless routers 26, and a device dispense unit 30 that dispenses devices such as portable electronic device 10. A visitor to the parking facility 50 receives a portable electronic device 10 upon entry into the parking facility 50. An electronic time stamp is generated at the entry time and stored on the portable electronic device 10. As the visitor drives a vehicle throughout the parking facility 50, the portable electronic device 10 transmits its location to one or more of the wireless routers 26, which forward the location data to the server computing device 22. The server computing device 22 then generates mappable data to transmit back to the portable electronic device 10, so that the portable electronic device 10 can generate and display a map of the facility with the current location of the visitor displayed on the map. Also, the server computing device 22 retrieves advertising information related to the current location of the visitor from the database 24. In some embodiments, the server 22 retrieves images, CGI, text, and/or video data from the database 24 and transmits the data to the portable electronic device 10 for display in the advertising area 20 of the GUI showing the facility map 16 on the display screen 14 of the portable electronic device 10.

Five parking levels are included in this example parking facility 50. As shown, each level of the parking facility 50 includes a wireless router 26. Thus, when a visitor's car moves from a lower level to an upper level, the wireless router 26 at the upper level transmits data to the server 22 indicating that the visitor identified by the portable electronic device 10 is on the upper level. In that regard, the server 22 retrieves the updated views for the parking facility and transmits the views to the portable electronic device 10. Similarly, the server 22 retrieves updated advertising data from the database 24 and transmits the advertising data to the portable electronic device 10.

For example, when a visitor enters the parking facility 50 on the first level, the visitor obtains a portable electronic device 10 from the device dispenser 30. As the visitor drives a vehicle from the first level to the second level of the parking facility 50, the wireless router 26 on the second level transmits the visitor's location to the server 22 and receives the updated map views and advertising from the server 22 (to thereafter transmit back to the portable electronic device 10 of the visitor). Since different levels of the parking facility 50 may be closer to certain vendors than other levels of the parking facility, the server 22 only retrieves the advertising information from the database 24 which is relevant to the vendors at each particular level of the parking facility 50. In this way, the visitor gets real-time map updates based on the current location of the portable electronic device 10 as the visitor drives through the parking facility 50 and also receives advertising that is relevant to the particular level on which the vehicle of the visitor is presently located.

The facility mapping and tracking system 28 differs from and improves upon currently existing magnetic stripe-based paper ticket systems. In particular, some embodiments of the facility mapping and tracking system differ because in current systems, a parking ticket is a piece of paper with magnetic tape which contains very limited information and can be used only to pay for the parking and to exit the shopping mall or any other business facility parking structure. In contrast, the portable electronic device 10 described in this document provides an ability for a facility to collect and analyze every visitor experience and at the same time to provide convenient way for businesses and vendors proximate to the parking facility to deliver advertising content to the visitors.

Figure 6:
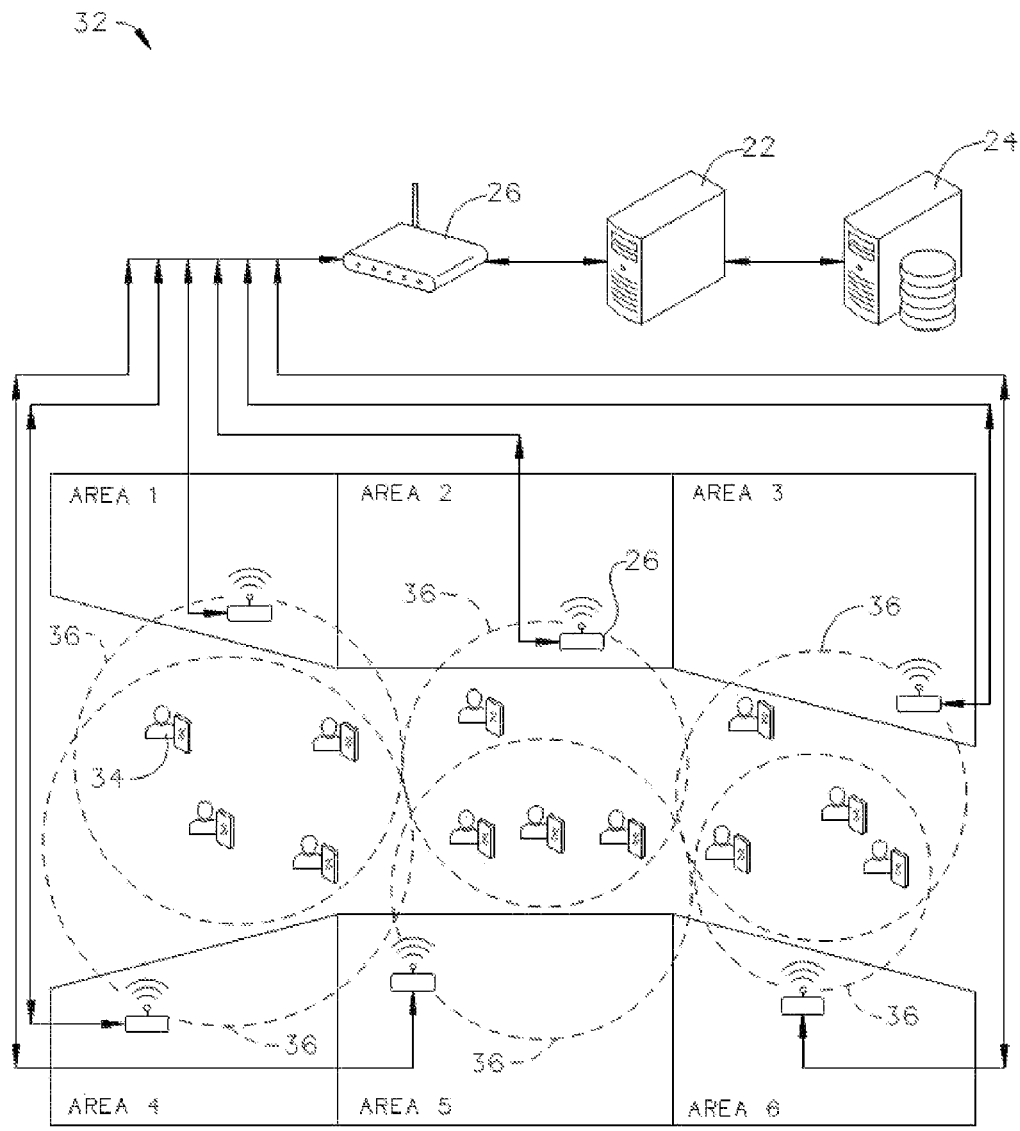
FIG. 6 conceptually illustrates a schematic view of a facility map generating system used in a building facility in some embodiments.

While the facility mapping and tracking system 28 described by reference to FIG. 5 is implemented for a parking facility 50, in some embodiments, a facility mapping and tracking system is implemented for other types of facilities. For example, FIG. 6 conceptually illustrates a schematic view of a facility mapping and tracking system 32 used in a building facility 52. As shown in this figure, the facility mapping and tracking system 32 includes the server computing device 22, the database server computing device 24, a set of wireless routers 26, and a set of areas 36. Each area 36 is associated with a wireless range of one of the wireless routers 26. In some facility locations, a facility visitor 34 can be present at a location within the wireless range of two or more wireless routers 26. When a visitor 34 is in an area 36 or in overlapping areas 36, the portable electronic device 10 used by the visitor 34 transmits location data to the wireless router 26 or routers 26 within wireless communication range (as shown by areas 36). The router(s) 26 transmits the location data to the server 22, which then computes map updates based on the location data and transmits the updated map data to the visitor 34 by way of the router(s) 26. The server 22 also retrieves advertising data from the database 24 and transmits the advertising data to the visitor 34 by way of the router(s) 26. Since the visitor's general location is known by the area(s) 36 associated with the visitor's location, the server can retrieve specific, targeted advertising from the database 24, where the retrieved advertising data relates directly to businesses or vendors proximate to the visitor's present area(s) 36. In this way, a visitor 34 can walk through the facility 52 and get live updates of the facility map while walking, and also receive advertising related to businesses and vendors that are nearby (or being walked toward or past).

To use the facility mapping and tracking system of the present disclosure, one or more computer-implemented processes are performed by a portable multifunction device with a touch screen display and a facility server 22. For example, after receiving the portable multifunction device 10 from parking card dispenser 30, the portable multifunction device 10 receives mappable data from the facility server 22 and displays an interactive map of the facility, while also displaying present, real-time map position indicators while the portable multifunction device 10 is carried by a visitor throughout of the facility. In some cases, the map displays supplementary data useful to the visitor of the facility, including map displays of available parking slots on each level of the parking structure and/or highlighted arrows showing facility routes which a visitor can traverse by car or foot to get to a particular destination related to the facility (e.g., a particular store, a particular open parking spot such as a handicapped parking spot, etc.).

Figure 7:
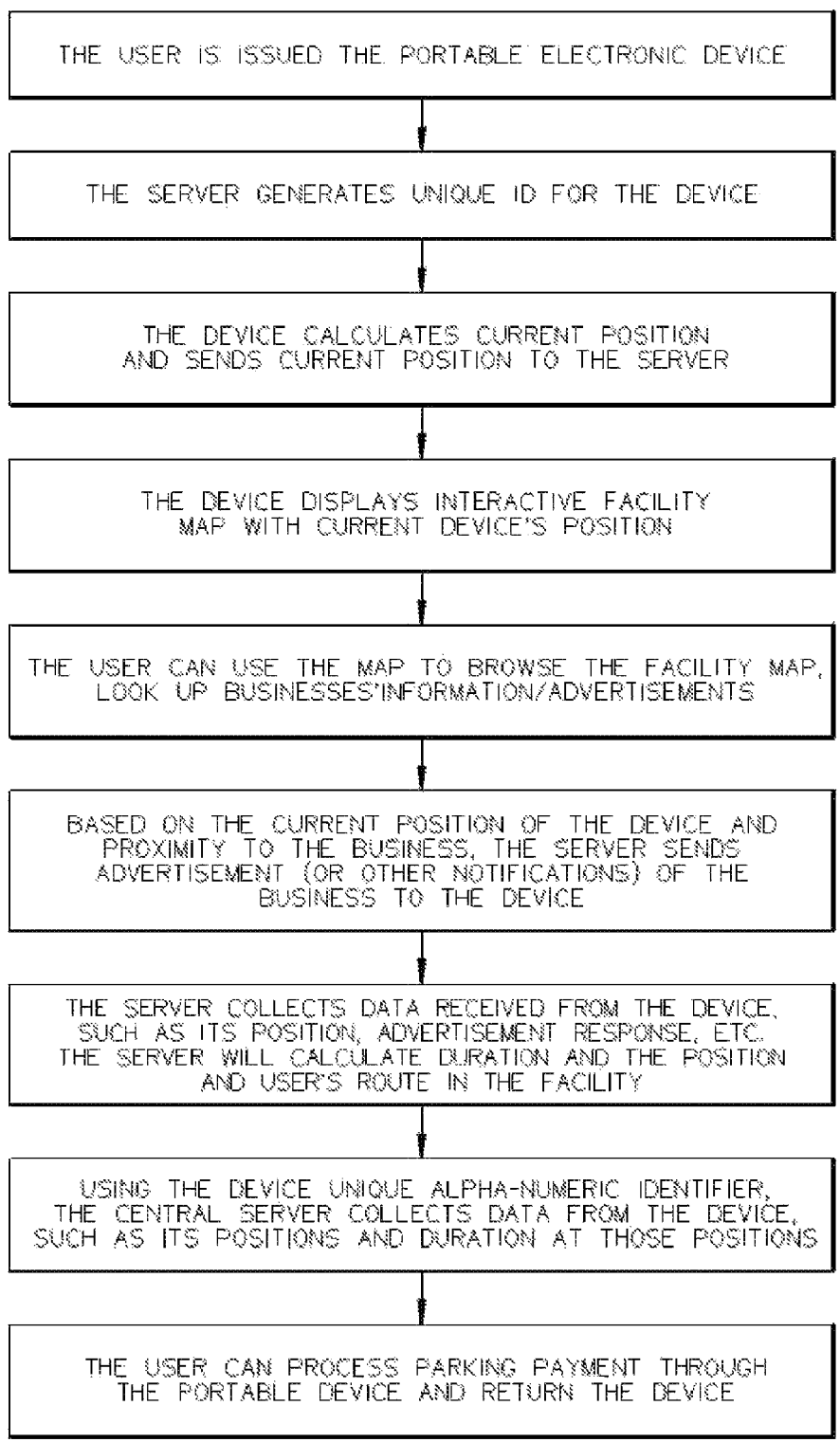
FIG. 7 conceptually illustrates a system process for displaying and interacting with an interactive graphical facility map in some embodiments.

By way of example, FIG. 7 conceptually illustrates a system process 54 for displaying and interacting with an interactive graphical facility map in some embodiments. As shown in this figure, the system process 54 starts when a visitor (i.e., a "user") enters a facility. Upon entering, the user is issued a portable electronic device. As described above, the facility's device dispenser 30 will capture a time of entry and save the entry time on the device when an amount of time at the facility is tracked (e.g., at a parking facility). However, if time is not tracked, the dispenser may issue the portable electronic device without saving any information.

After being issued the portable electronic device, the process 54 proceeds to the next step of the facility server 22 generating a unique ID for the portable electronic device. In some embodiments, each portable electronic device has a unique ID in order to provide accurate facility mapping data in relation to the location of each specific device. In some embodiments, each portable electronic device has a unique ID that is associated with a hardware ID of the portable electronic device, and instead of generating a unique ID for such portable electronic device, the facility server 22 merely receives an "activation" signal from the portable electronic device once the user receives the device from the dispenser. If a unique ID was generated by the server, however, then the portable electronic device stores the unique ID during the duration of use of the portable electronic device by the present user.

Next, the process 54 includes the device calculating a current position of the user and transmitting the current position to the facility server 22 (by way of a nearby wireless router 26). The portable electronic device then receives mappable data from the server. The process 54 then includes steps for the device to display the interactive facility map with the indicator shown on the map to indicate the user's current position. The user can then use the facility map to browse through the facility, look up businesses, parking spots, vendors, bathrooms, food courts, services, and any of several other facility-related things.

Contemporaneously with displaying the facility map for the user to interact with and obtain facility-related location information, the process 54 also includes receiving and displaying advertisements on the portable electronic device. Thus, as the user walks/drives through the facility, the server 22 may retrieve and transmit specific advertisement data related to vendors or businesses proximate to the user's present position.

Additionally, while providing map updates and displaying advertising images and information on the portable electronic device, the server 22 in some embodiments of the facility mapping and tracking system collects data received from the portable electronic device. Examples of such information received from the portable electronic device include position data, movement trend data, advertisement response and/or interaction, etc. In some embodiments, the server calculates the duration of time spent at the facility (when relevant) and collects vendor-specific information, such as time spent in areas proximate to a vendor and/or interactions by the user with advertisements related to a vendor.

Next, the user may deposit the portable electronic device with the dispensing unit upon leaving the facility. In some embodiments, the user pays for parking through the portable device prior to returning the device. Once the device is returned, the process 54 ends.

III. Facility Mapping and Visitor Tracking Processes

In some embodiments, the set of facility mapping and visitor tracking processes includes a user process for obtaining a portable electronic device and then displaying and interacting with an interactive graphical facility map on a display screen of the portable electronic device used by a facility visitor. In some embodiments, the user process includes electronically identifying the facility visitor as a user and generating a facility map in relation to a location of the identified user in the facility.

Figure 8:
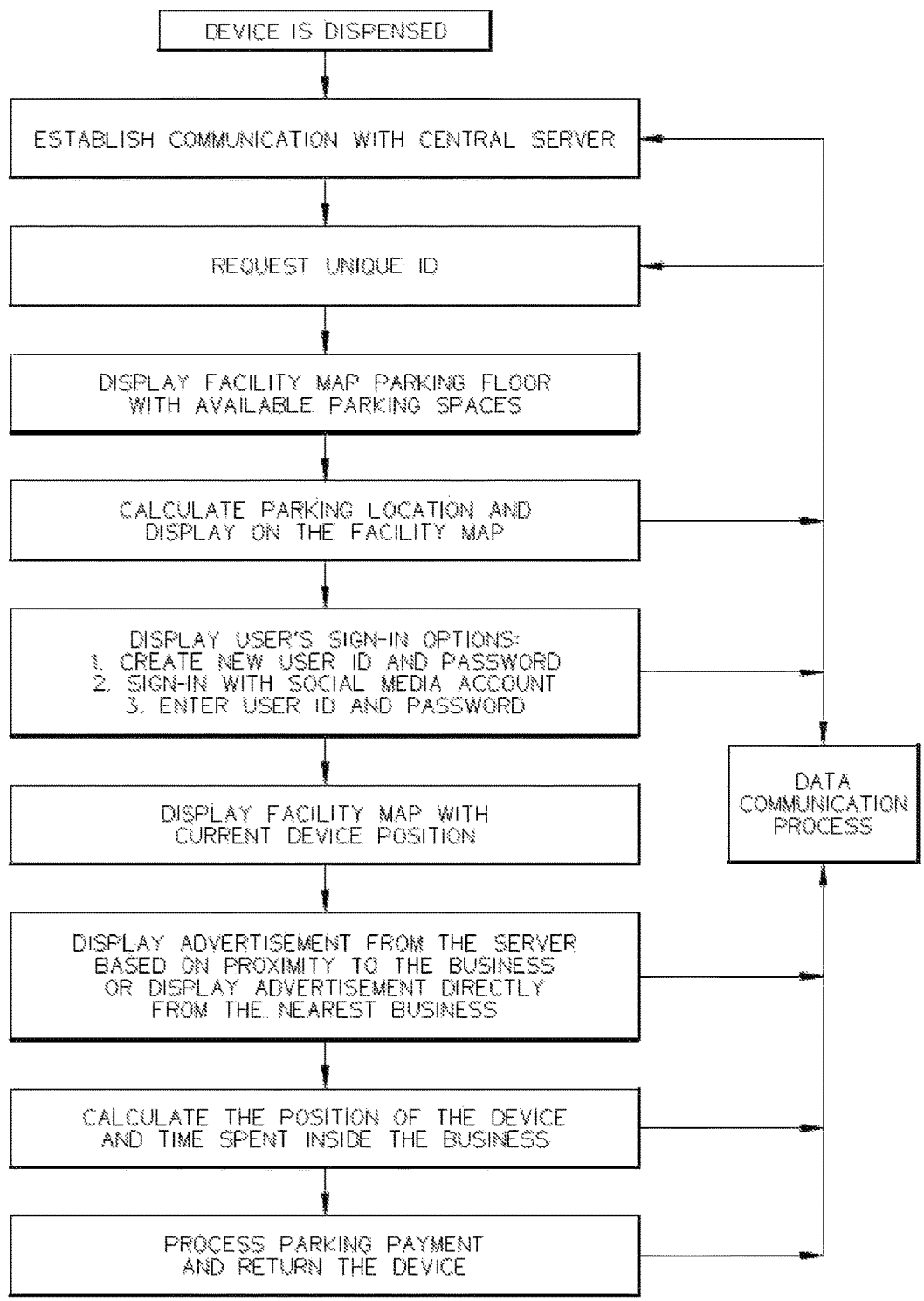
FIG. 8 conceptually illustrates a user process for obtaining a portable electronic device and then displaying and interacting with an interactive graphical facility map on a display screen of the portable electronic device used by a facility visitor in some embodiments.

By way of example, FIG. 8 conceptually illustrates a user process 56 for obtaining a portable electronic device and then displaying and interacting with an interactive graphical facility map on a display screen of the portable electronic device used by a facility visitor. As shown in this figure, the user process 56 includes steps performed by a user of a portable electronic device at a particular facility. However, the user process 56 includes several steps that involve data communication with a server process 58, which is described further below by reference to FIG. 9. Thus, a person skilled in the art would understand that the user process 56 and the server process 58 work together by way of a data communication process. For example, the portable electronic device and the server computing device may communicate wirelessly via a wireless router.

The user process 56 starts when a visitor arrives at a facility and a device is dispensed to the visitor. For example, the visitor may enter a parking garage and obtain a portable electronic device when driving into the garage. The user process 56 then establishes communication with the server (e.g., wireless communication via a wireless router). In some embodiments, the user process 56 receives a set of data from the server indicating that the communication is established. Once communication is established, the user process 56 requests a unique identifier (i.e., "ID" or "UID"). The unique ID is requested by the process 56 because in a typical usage case there may be several or even hundreds (or more) dispensed portable electronic devices being used by visitors. Thus, in order to distinguish one portable electronic device from another portable electronic device, the user process 56 requests a unique ID to use in all communications with the server.

In some embodiments, the user process 56 next displays a facility map. For example, if the visitor entered a parking facility, the user process 56 may display a parking facility map showing parking spaces that are available on each floor of the parking facility. In some embodiments, the parking facility map distinguishes the display of parking spaces which are open for parking and parking spaces which are presently occupied. In some embodiments, the user process 56 also calculates a preferred parking location and displays the parking location on the parking facility map. Next, the user process 56 displays user sign-in options, including (i) an option to create a new user ID and password (for new visitors to the facility, or visitors who do not have a user ID and password), (ii) an option to sign-in with a social media account (e.g., sign-in to an existing facility account using a set of social media account credentials or register a new facility account by signing-in with a set of social media account credentials), and (iii) enter user ID and password.

Once the visitor is logged into the facility account, a set of user account features are activated in relation to using the portable electronic device. First, the user process 56 displays the facility map from the perspective of a current location of the portable electronic device. Next, the user process 56 displays one or more advertisements received from the server. The server transmits the advertisements based on the current location of the portable electronic device. For example, the server may transmit advertisements from two vendors nearby the current location of the portable electronic device, or may transmit an advertisement from the closest vendor only. The advertisements can also be based on identifying features of the user (e.g., known features of the visitor, such as gender or approximate age group). For example, the server may filter out advertisements from a nearby vendor that are intended for a female audience when the user account is understood to be associated with a male visitor, or the server may filter out advertisements from a nearby video game vendor when the user account is understood to belong to an elderly visitor.

In some embodiments, the user process 56 calculates the position of the portable electronic device and any movements of the device. Similarly, the user process 56 of some embodiments calculates durations of time spent in one or more stores/vendors. After the visitor is finished at the facility, the visitor may use the portable electronic device to pay for parking and thereafter returns the device to a dispensing unit. Thus, the user process 56 processes payment for the duration of the parking and adds the returned portable electronic device to the set of devices available to be dispensed to other visitors. The user process 56 then ends.

In some embodiments, the set of facility mapping and visitor tracking processes includes a server process for registering a portable electronic device dispensed to a facility visitor and then generating an interactive graphical facility map and communicating with the portable electronic device used by the visitor at the facility. In some embodiments, the server process includes electronically identifying the facility visitor as a user, tracking a movement of the user within the facility, mapping a facility location of the user in real-time based on the tracked movement of the user, and updating a facility map view to display for a facility map associated with the identified user based on the mapped, real-time facility location of the user.

Figure 9:
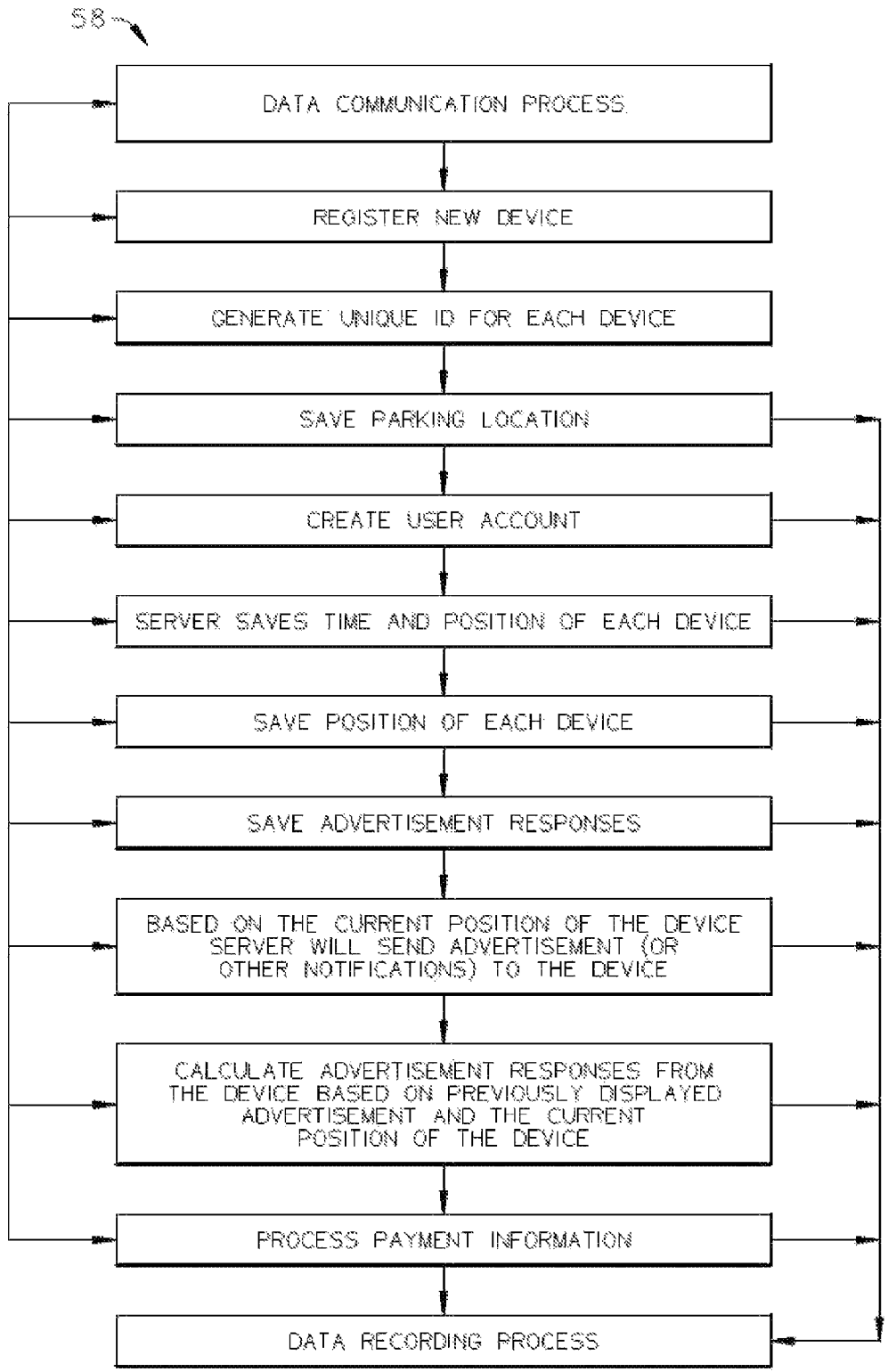
FIG. 9 conceptually illustrates a server process for registering a portable electronic device dispensed to a facility visitor and then generating an interactive graphical facility map and communicating with the portable electronic device used by the visitor at the facility in some embodiments.

By way of example, FIG. 9 conceptually illustrates a server process 58 for registering a portable electronic device dispensed to a facility visitor and then generating an interactive graphical facility map and communicating with the portable electronic device used by the visitor at the facility. As shown in this figure, the server process 58 includes steps performed by way of a data communication process established with a portable electronic device being used by a visitor of a facility. The server process 58 starts when the portable electronic device being used by the facility visitor establishes communication with the server (e.g., wireless communication via a wireless router). The server process 58 then registers the portable electronic device and generates a unique ID for the portable electronic device.

After initializing the communication between the server and the portable electronic device, and setting up a unique ID to distinguish the portable electronic device from other portable electronic devices being used at the facility, the server process 58 then saves a particular parking location to associate with the portable electronic device (and visitor). In some embodiments, the server process 58 also creates a user account (if not yet established) or receives user account log-in credentials.

Next, the server process 58 saves the time and position of each portable electronic device currently in use. After the position of a portable electronic device is established and saved, if any responses or feedback are received from the portable electronic device in regards to particular advertisements, the server process 58 saves the responses and feedback. In some embodiments, the server process 58 then sends advertisements and notifications (map updates, etc.) to the portable electronic device based on its current location. The server process 58 then calculates advertisement responses from the portable electronic device based on previously displayed advertisement(s) and the current position of the portable electronic device. The server process 58 then processes payment information received from the portable electronic device and begins to save the data associated with a portable electronic device session (i.e., saved in relation to the user's account or the unique ID). The server process 58 then ends.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. For example, while many of the features are described in relation to a facility, in general, or a parking facility, in particular, the present disclosure generally works in relation to any type of facility or area. For instance, embodiments of the portable electronic device can be implemented for use in a wide area in which a central server provides a wide area map to the portable electronic device, allowing a user of the device to explore the wide area and interact with the device to find out information about specific entities in the wide area. An example of a wide area is a municipality or urban region (e.g., downtown area of a city). In such a situation, the central server could provide a municipality or urban region map to a portable electronic device of a visitor to a particular city. Features may include the ability to discover hotels, restaurants, night life entertainment, commercial businesses, museums, parks, etc., in the particular city and make payments, reserve tables or seats, add credits to parking spots, etc., all with the portable electronic device. Thus, one of ordinary skill in the art would understand that the invention is not to be limited by the foregoing illustrative details, but rather is to be defined by the appended claims.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs. Many of the above-described features and applications are implemented with a portable electronic device, such as any of the portable electronic devices described by reference to FIGS. 1-4.

Figure 10:
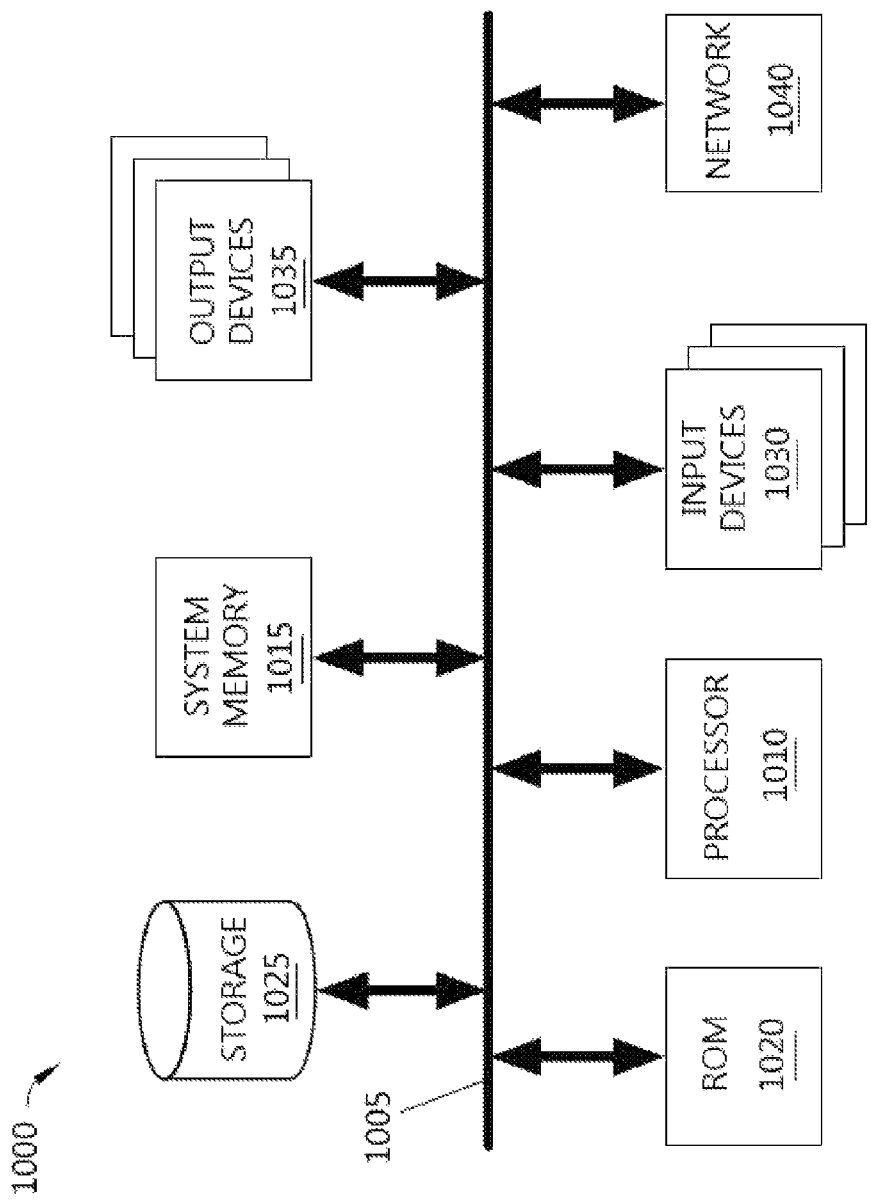
FIG. 10 conceptually illustrates conceptually illustrates an electronic system with which some embodiments of the invention are implemented.

FIG. 10 conceptually illustrates an electronic system 1000 with which some embodiments of the invention are implemented. The electronic system 1000 may be a computer, phone, PDA, or any other sort of electronic device. Such an electronic system includes various types of computer readable media and interfaces for various other types of computer readable media. Electronic system 1000 includes a bus 1005, processing unit(s) 1010, a system memory 1015, a read-only 1020, a permanent storage device 1025, input devices 1030, output devices 1035, and a network 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only 1020, the system memory 1015, and the permanent storage device 1025.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1020 stores static data and instructions that are needed by the processing unit(s) 1010 and other modules of the electronic system. The permanent storage device 1025, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1025.

Other embodiments use a removable storage device (such as a floppy disk or a flash drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor needs at runtime. In some embodiments, the invention's processes are stored in the system memory 1015, the permanent storage device 1025, and/or the read-only 1020. For example, the various memory units include instructions for processing appearance alterations of displayable characters in accordance with some embodiments. From these various memory units, the processing unit(s) 1010 retrieves instructions to execute and data to process in order to execute the processes of some embodiments.

The bus 1005 also connects to the input and output devices 1030 and 1035. The input devices enable the user to communicate information and select commands to the electronic system. The input devices 1030 include alphanumeric keyboards and pointing devices (also called "cursor control devices"). The output devices 1035 display images generated by the electronic system 1000. The output devices 1035 include printers and display devices, such as cathode ray tubes (CRT) or liquid crystal displays (LCD). Some embodiments include devices such as a touchscreen that functions as both input and output devices.

Finally, as shown in FIG. 10, bus 1005 also couples electronic system 1000 to a network 1040 through a network adapter (not shown). In this manner, the computer can be a part of a network of computers (such as a local area network ("LAN"), a wide area network ("WAN"), or an intranet), or a network of networks (such as the Internet). Any or all components of electronic system 1000 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 7-9 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A facility mapping and visitor tracking system that tracks a location of a visitor within a facility to generate a facility map and deliver targeted area-specific advertising to a visitor based on the location of the visitor, said facility mapping and visitor tracking system comprising:
a database management system that stores advertising data associated with a plurality of businesses within the facility;
a first plurality of contiguous areas of the facility, wherein each area in the first plurality of contiguous areas is defined by a perimeter that surrounds the area, wherein each area in the first plurality of contiguous areas includes a set of businesses that are located within the perimeter that surrounds the area, wherein the set of businesses located within the perimeter that surrounds each area in the first plurality of contiguous areas is different from the businesses located within the perimeters of the other areas in the first plurality of contiguous areas of the facility;

a first plurality of wireless communication devices, wherein each wireless communication device in the first plurality of wireless communication devices is located within one area of the first plurality of contiguous areas that is different from the area in which each other wireless communication device is located, wherein each wireless communication device in the first plurality of wireless communication devices defines a wireless communication range associated with an area in the first plurality of contiguous areas of the facility, wherein each wireless communication range exceeds the defined perimeter that surrounds the associated area;

a portable electronic device dispenser that is physically positioned at an entry point of the facility to dispense portable electronic devices to visitors entering the facility and receive returned portable electronic devices from visitors leaving the facility;

a particular portable electronic device dispensed, from the portable electronic device dispenser, to the visitor to provide facility map views of the facility and deliver targeted advertising to the visitor, wherein the particular portable electronic device is configured to connect wirelessly to a particular wireless communication device located in a particular area in the first plurality of contiguous areas when the visitor is located within a wireless communication range associated with the particular area, wherein the particular portable electronic device is configured to receive a particular facility map view from the particular wireless communication device and to display the particular facility map view on a screen of the portable electronic device while the visitor is located within the wireless communication range associated with the particular area, wherein the particular portable electronic device is configured to update the facility map view displayed on the screen in real-time as the location of the visitor changes from the wireless communication range associated with the particular area to a different wireless communication range associated with a different wireless communication device that is located in an area that is contiguous with the particular area in the first plurality of contiguous areas of the facility; and a central server that generates a unique identifier (UID) to associate with identifying information about the visitor and a unique hardware identifier of the particular portable electronic device dispensed to the visitor, wherein the central server is configured to transmit facility map views to the particular portable electronic device based on the location of the visitor.

2. The facility mapping and visitor tracking system of claim 1, wherein the facility is a building facility with a set of building facility entry points, wherein each visitor is a consumer who enters the building facility at a building facility entry point, wherein the portable electronic device dispenser is a building facility portable electronic device dispenser in a set of building facility portable electronic device dispensers, wherein each building facility entry point has a building facility portable electronic device dispenser, wherein targeted advertisements are displayed on the portable electronic device dispensed to each visitor.

3. The facility mapping and visitor tracking system of claim 2, wherein the database management system that stores advertising data associated with a plurality of businesses within the building facility further stores area location data for each business that indicates the area in which the business is located within the first plurality of contiguous areas of the facility.

4. The facility mapping and visitor tracking system of claim 3, wherein the central server further identifies each visitor by a set of user credentials the visitor inputs into the portable electronic device when the portable electronic device is dispensed to the visitor, wherein the identifying information about the visitor comprises the set of user credentials, wherein the central server transmits the targeted advertisements based on the identified visitor using the portable electronic device, wherein the targeted advertisements comprise at least one of a textual advertisement of a first nearby business which is located within an area in the first plurality of contiguous areas of the facility associated in which a wireless communication device is located and which is associated with a wireless communication range in which the identified visitor is located, a video advertisement of a second nearby business which is located within an area in the first plurality of contiguous areas of the facility associated in which a wireless communication device is located and which is associated with a wireless communication range in which the identified visitor is located, a computer graphics image (CGI) advertisement of a third nearby business which is located within an area in the first plurality of contiguous areas of the facility associated in which a wireless communication device is located and which is associated with a wireless communication range in which the identified visitor is located, and a set of advertisements of nearby businesses located within another different area of the facility that is different from the area in the first plurality of contiguous areas of the facility associated in which a wireless communication device is located and which is associated with a wireless communication range in which the identified visitor is located.

5. The facility mapping and visitor tracking system of claim 4, wherein the different area of the facility is a nearby area that is contiguous to the area in the first plurality of contiguous areas of the facility, wherein the identified visitor is located in both the wireless communication range associated with the wireless communication device located in the area and a different wireless communication range associated with a different wireless communication device located in the different area of the first plurality of contiguous areas of the facility.

6. The facility mapping and visitor tracking system of claim 4 further comprising a second plurality of contiguous areas of the facility that are separated from the first plurality of contiguous areas of the facility by a middle walking area, wherein each area in the second plurality of contiguous areas of the facility is defined by a perimeter that surrounds the area, wherein each area in the second plurality of contiguous areas of the facility includes a set of businesses that are located within the perimeter that surrounds the area, wherein the set of businesses located within the perimeter that surrounds each area in the second plurality of contiguous areas of the facility is different from the businesses located within the perimeters of the other areas in the first plurality of contiguous areas of the facility and in the second plurality of contiguous areas of the facility.

7. The facility mapping and visitor tracking system of claim 6, wherein the different area of the facility is a separated area in the second plurality of contiguous areas of the facility, wherein the identified visitor is located in both the wireless communication range associated with the wireless communication device located in the area in the first plurality of contiguous areas of the facility and an overlapping wireless communication range associated with a separate wireless communication device located in the separated area of the second plurality of contiguous areas of the facility.

* * * * *